J. T. HUGHES.
CORN PICKER.
APPLICATION FILED DEC. 7, 1918.
1,373,428.
Patented Apr. 5, 1921.
4 SHEETS—SHEET 1.
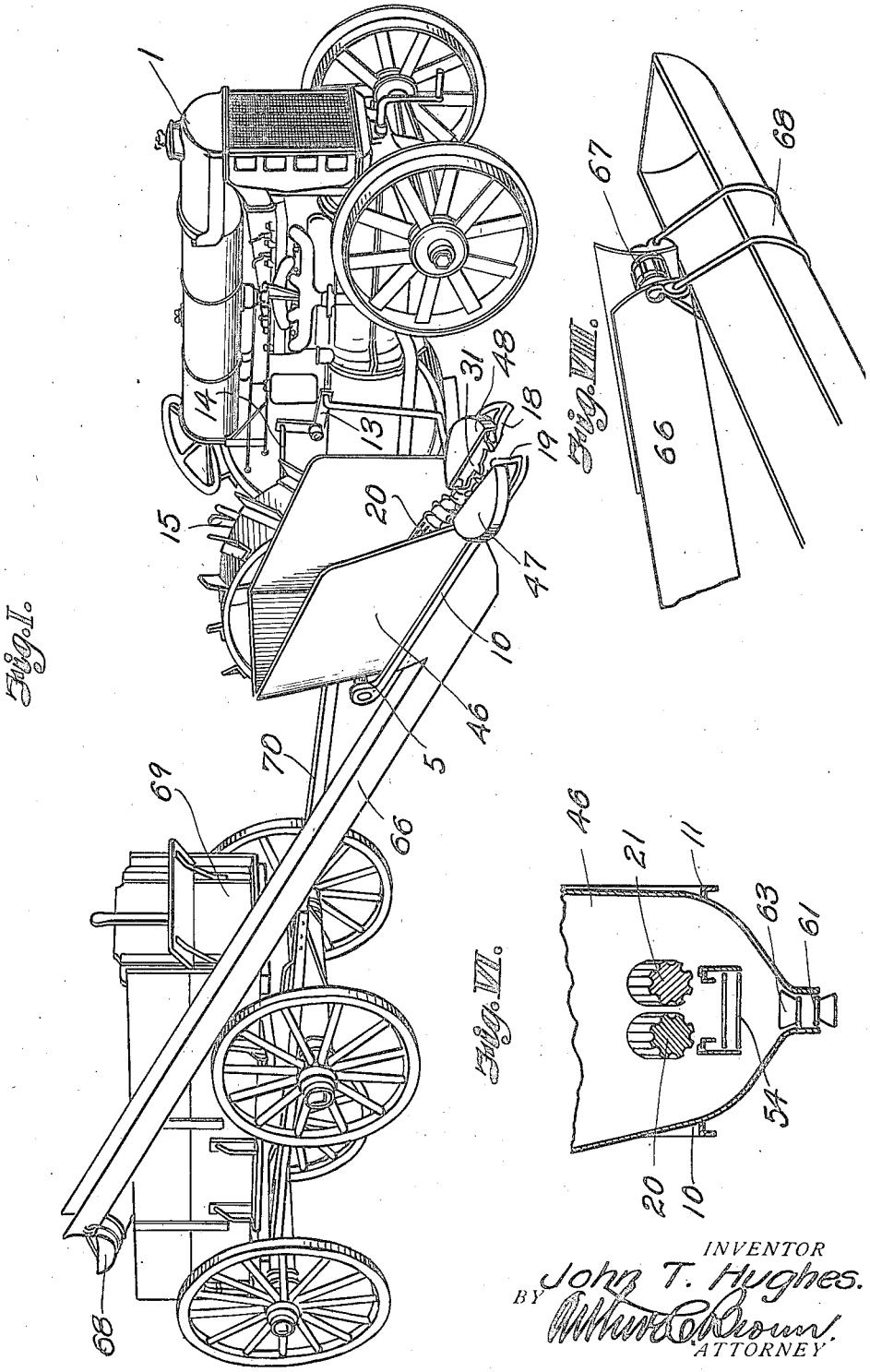
INVENTOR
John T. Hughes.
BY
ATTORNEY

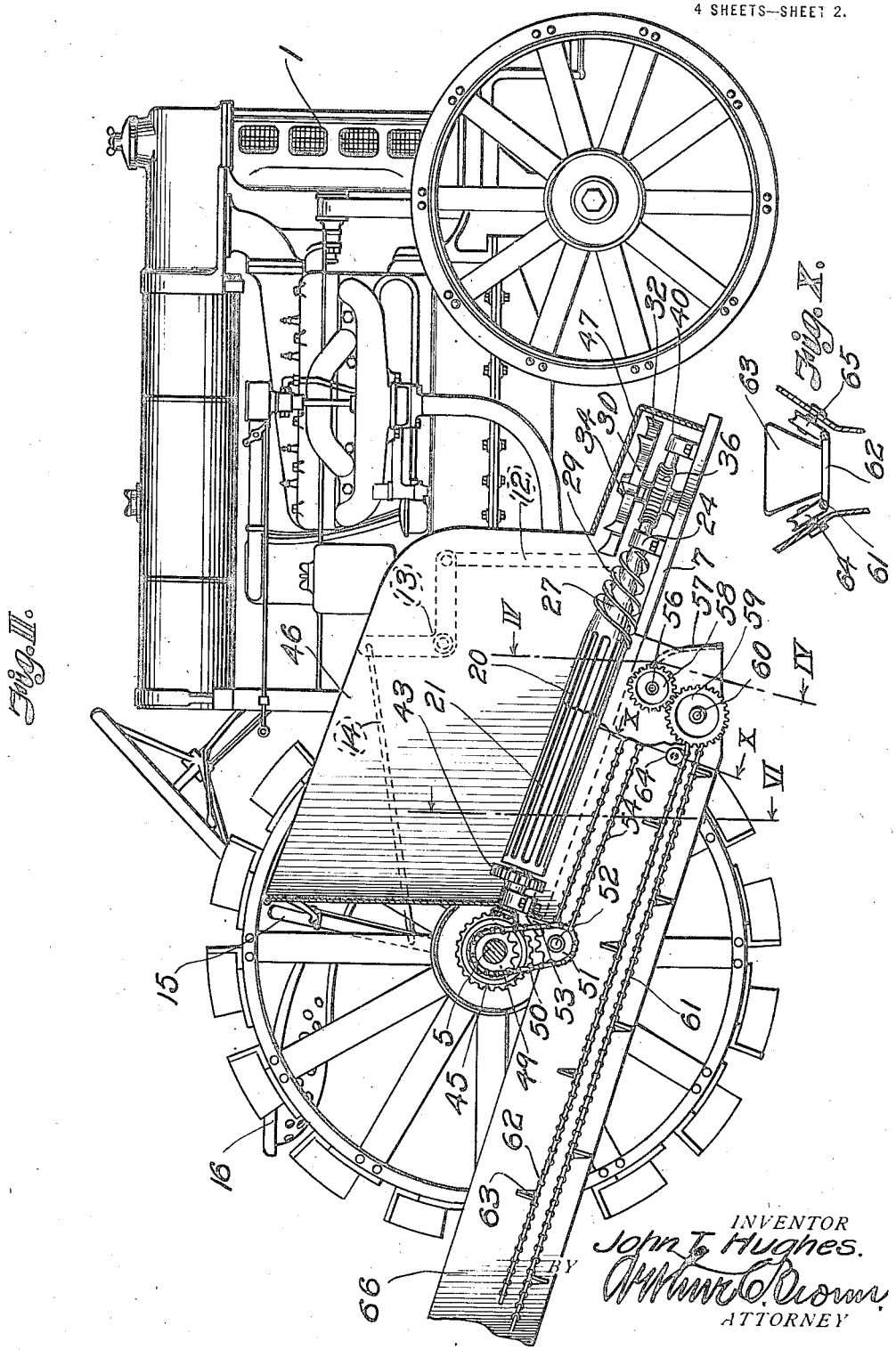

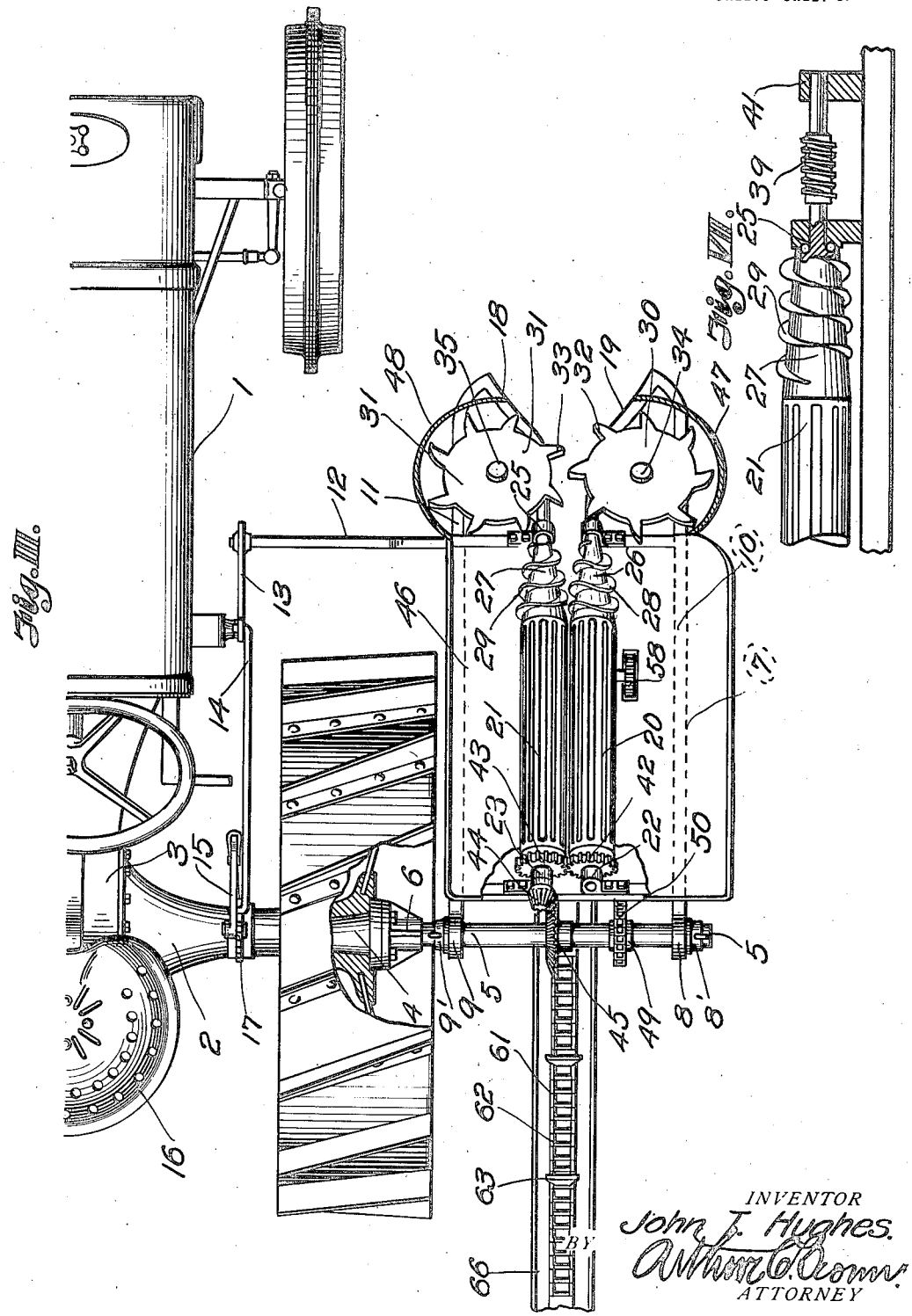

J. T. HUGHES.
CORN PICKER.
APPLICATION FILED DEC. 7, 1918.
1,373,428.
Patented Apr. 5, 1921.
4 SHEETS—SHEET 4.
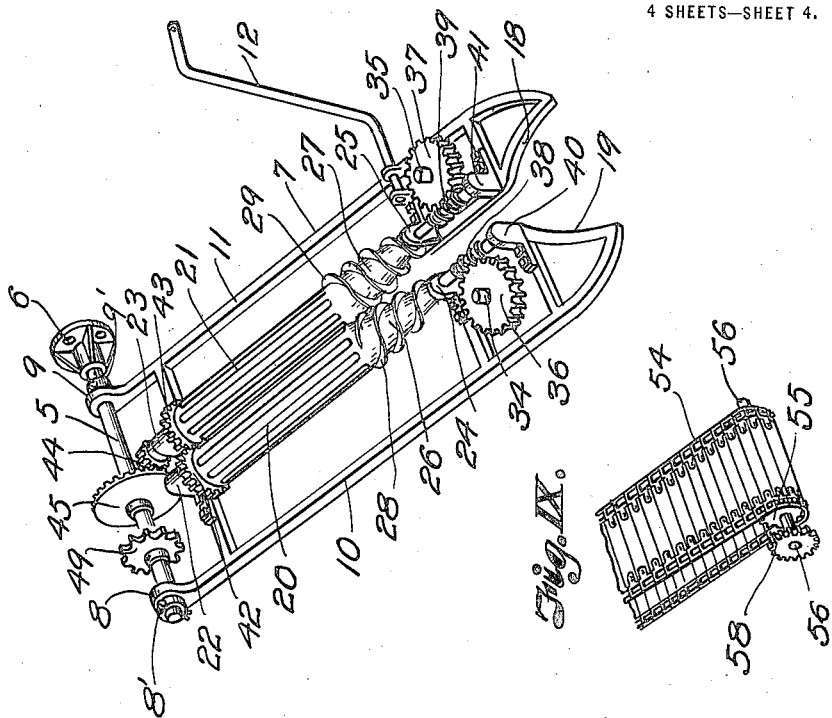
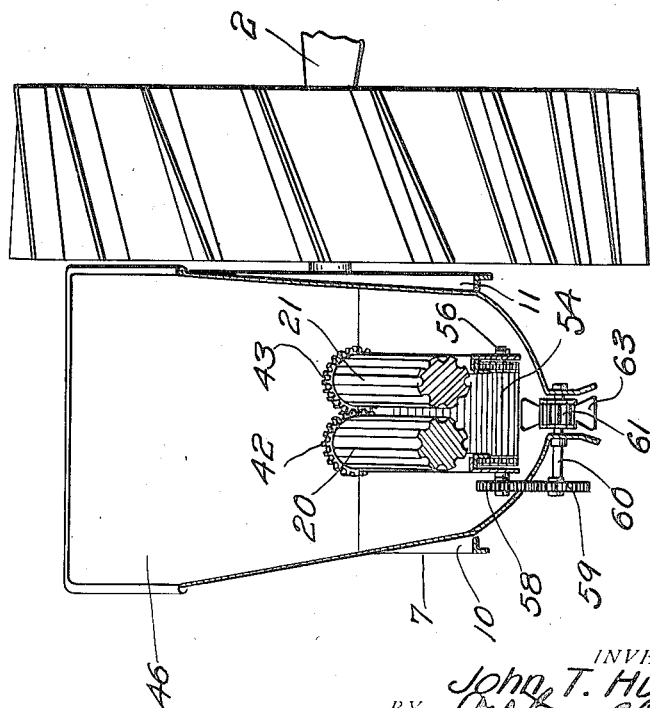
INVENTOR.
John T. Hughes.
BY
ATTORNEY

UNITED STATES PATENT OFFICE.

JOHN T. HUGHES, OF WAKENDA, MISSOURI.

CORN-PICKER.

1,373,428.

Specification of Letters Patent.

Patented Apr. 5, 1921.

Application filed December 7, 1918. Serial No. 265,729.

*To all whom it may concern:*

Be it known that I, JOHN T. HUGHES, a citizen of the United States, residing at Wakenda, in the county of Carroll and State of Missouri, Route 1, have invented certain new and useful Improvements in Corn-Pickers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.
This invention relates to corn pickers or harvesters and one of the objects thereof is to provide a device of the class described which may be conveniently attached to a known type of tractor to be propelled thereby without the necessity of disturbing any of the tractor parts. The corn picker mechanism is capable of arrangement to accommodate itself to various types of tractors but the mechanism shown herein is particularly adapted for association with the type of tractor, which includes a split rear tractor wheel-carrying axle driven by a differential gearing in a well-known manner.

The device contemplates the provision of means for guiding the stalks between snapping rolls to snap the ears from the stalks and convey them to a suitable receptacle as, for example, a wagon connected to the tractor as a trailer, the stalks being deposited upon the ground over which the device travels.

The invention also contemplates the provision of means whereby the harvesting mechanism frame may be pivotally supported to enable it to be tilted toward and away from the ground to move it into operative position when the ground is unobstructed or to move it out of operative position when there are obstructions such as stumps or when passing over ditches, etc.

I have provided means whereby the operating shaft for the harvesting mechanism may be conveniently attached to and detached from the drive shaft, or drive wheel of the tractor, as the case may be, the construction being so arranged that the drive shaft for the mechanism also serves as its support.

Other objects and advantages of the invention will be specifically described herein-after, it being understood that changes and form, proportion and minor details of construction may be resorted to without departing from the spirit of the invention or sacrificing any of its advantages.

In the drawings,

Figure I is a perspective view of a tractor, a corn picker and a trailer arranged in accordance with my invention.

Fig. II is a side elevational view of a tractor to which the corn picker is applied, the latter being shown partly in sections and partly in elevation.

Fig. III is a fragmentary view of a tractor, the corn picking mechanism being shown in plan.

Fig. IV is a cross sectional view on the line IV—IV of Fig. II.

Fig. V is a detail perspective view of the snapping rolls and the operating mechanism.

Fig. VI is a cross sectional view on the line VI—VI of Fig. II.

Fig. VII is an enlarged detail view of one end of one of the snapping rolls, showing the worm for operating one of the gatherers.

Fig. VIII is a detail perspective view of the discharge end of the corn conveyer and a chute for guiding the corn into the receptacle or trailer.

Fig. IX is a detail perspective view of the stalk discharge belt, and

Fig. X is a cross sectional view on the line X—X of Fig. II.

Referring now to the drawings by numerals of reference:

1 designates a tractor which may be of any preferred construction and which is here shown as being provided with a split axle 2 driven by a suitable differential gearing 3. To the member 4 of the split axle is secured a drive shaft 5 which may be fastened to the axle member by any well-known means as, for example, by the fastening device 6, the fastening device specifically forming no part of my invention because the shaft 5 may also be conveniently attached to a tractor wheel if desired.

By referring to Figs. II, III and V it will be observed that the shaft 5 projects laterally beyond the tractor wheel and that the frame 7 is swingingly secured thereto by permitting the shaft 5 to pass through the openings in the enlarged portions 8 and 9 on the side bars 10 and 11 of frame 7. Any sidewise motion of the frame will be prevented by the collars 8' and 9'. To the frame 7 is pivotally secured a hanger or link 12 connected to an elbow lever 13, preferably attached to the side of the tractor, the elbow lever being adapted to be operated by a link 14 connected to the ratchet lever 15 within convenient reach of the operator from the seat 16 of the tractor whereby through the action of the ratchet lever 15 and the ratchet 17 the frame may be adjusted to any swinging position or tilted to a substantially horizontal position to avoid contact with stumps, projections, etc., as will be more fully explained hereinafter.

The frame 7 is provided at its forward ends with curved guide or gatherer fingers 18 and 19 on opposite sides of a longitudinally extending space or slot in the frame over which are positioned the snapping rolls 20 and 21. The snapping rolls 20 and 21 are journaled in the bearings 22, 23, 24 and 25 respectively and are slightly spaced apart as shown. Each snapping roll is provided with longitudinal ribs or projections in the form of corrugations and at the forward ends of the respective rolls are the conical portions 26 and 27 which are provided with the spiral flanges or conveyer ribs 28 and 29, which are adjacent to and slightly in rear of the gatherer disks 30 and 31 provided with the radial fingers 32 and 33 respectively. The disks are fixed on shafts 34 and 35 carrying the gears 36 and 37 driven by the worms 38 and 39 on the ends of the respective snapping rolls 20 and 21, the ends of the worms being journaled in end bearings 40 and 41 on the frame 7. On the rear ends of the snapping rolls 20 and 21 are meshing gears 42 and 43, the gear 42 being driven by the gear 43 on the shaft of the snapping rolls 21, which shaft carries a beveled pinion 44 meshing with a beveled gear 45 on the shaft 5.

From the foregoing it will be apparent that when motion is imparted to the shaft 5 by the tractor that the snapping rolls will be driven in opposite directions, one toward the other and at the same time the gatherer fingers will be operated to grasp the stalks and move them toward the conveyer flanges so that they will pass between the snapping rolls 20 and 21 in order that the ears of corn may be snapped from the stalks and deposited on opposite sides of the hopper 46 carried by the frame 7. This hopper is provided with sides and rear ends, the front ends being opened as shown, the forward ends of the sides terminating adjacent to the guards 47 and 48 for the gatherer disks.

By referring to Figs. II, III and V, it will be observed that a sprocket 49 is provided on the shaft 5 which drives a chain 50 passing around a sprocket 51 on shaft 52, carried by brackets 53 on the frame 7 and this shaft 52 drives a chain belt 54 passing over sprockets 55 on shaft 56 transversely of and beneath the forward portions of the snapping rolls 20 and 21. The upper portion of the chain or belt 54 travels in a forward direction so that any stalks passing between the snapping rolls will be thrown to the ground over the shield 57.

On the shaft 56 is a gear 58 which meshes with a gear 59 in bearings hung from frame 7 and this gear drives a shaft 60 around which passes a conveyer belt 61, the upper surface of which moves in a rearward, upward, inclined direction and consists of links 62 with upstanding fingers 63 as shown. 64 and 65 are idlers, bearing upon the edge of the belt as best shown in Fig. 10. The belt conveyer opens in the rearwardly upwardly extending chute 66 which discharges its rear end 67 into a transversely slung trough or chute 68 whereby the corn conveyed to the rear may drop into the trailer 69, the tongue 70 of which is attached to the tractor in any well-known manner.

The proportions of the device are preferably such that the rearwardly extending chute or conveyer trough 66 will approximately counter-balance the weight of the frame 7 so that the frame may be raised and lowered to the medium of the ratchet lever 15 and its associated mechanism without the expenditure of any appreciable amount of energy. This enables the operator to swing the frame 7 upwardly whenever it is desired to raise the forward end of the frame 7 above obstructions or whenever it is desired to pass over ditches and the like.

From the foregoing it will be apparent that the device may be quickly and conveniently attached to and detached from a tractor and that when in operation the corn stalks will be gathered by the fingers 32 and 33 into the space between the conical ends 26 and 27 to be engaged between the conveyer flanges and moved in between the snapping rolls. The ears of corn will be snapped from the stalks and fall over into the hopper 46 and drop onto the belt 62. The stalks will be passed between the rolls onto the discharge belt 54 and pass off onto the ground. When a wagon becomes filled, it will be only necessary to detach it and apply another one.

If desired, the picker mechanism may be attached to the frame of a truck or other motor driven vehicle, the picker mechanism being driven by suitable connecting mechanism as, for example, a chain and sprockets, receiving its power from the hub of the rear wheel of the truck. Such construction enables the truck propelling mechanism to furnish the power for loading it.

Having thus described my invention what

I claim as new therein and desire to secure by Letters-Patent is:

1. In combination with the power axle of a tractor, a drive shaft connected to the power axle of the tractor, a frame swingingly mounted upon the drive shaft, a harvesting mechanism on said frame, a conveyer carried by the frame and counter-balancing the harvesting mechanism, and means for adjustably tilting said frame.

2. In combination with the power axle of a tractor, a drive shaft connected to the power axle of the tractor, a frame having its rear end swingingly mounted upon the drive shaft, a harvesting mechanism on said frame, a conveyer carried by the frame, and counter-balancing the harvesting mechanism, and means operatively connected to the frame to adjustably support the forward end of the frame at various angles with respect to the shaft.

3. In combination with the power axle of a tractor, a drive shaft connected to the power axle of the tractor, a frame having its rear end swingingly engaging said shaft, snapping rolls carried by said frame, means on the shaft for driving said snapping rolls, a conveyer beneath the frame, means on the shaft for driving said conveyer, and means for feeding the stalks to the snapping rolls.

In testimony whereof I affix my signature.

JOHN T. HUGHES.